United States Patent
Hill

(10) Patent No.: US 9,199,582 B2
(45) Date of Patent: Dec. 1, 2015

(54) VEHICLE CARGO ACCESSORY DEVICE

(71) Applicant: Jon Hill, Rock Springs, WY (US)

(72) Inventor: Jon Hill, Rock Springs, WY (US)

( * ) Notice: Subject to any disclaimer, the term of this patent is extended or adjusted under 35 U.S.C. 154(b) by 0 days.

(21) Appl. No.: 13/936,308

(22) Filed: Jul. 8, 2013

(65) Prior Publication Data

US 2014/0144961 A1     May 29, 2014

Related U.S. Application Data

(60) Provisional application No. 61/730,342, filed on Nov. 27, 2012.

(51) Int. Cl.
| | | |
|---|---|---|
| *B60R 9/00* | (2006.01) | |
| *B60R 9/048* | (2006.01) | |
| *B60R 9/058* | (2006.01) | |

(52) U.S. Cl.
CPC . *B60R 9/00* (2013.01); *B60R 9/048* (2013.01); *B60R 9/058* (2013.01)

(58) Field of Classification Search
CPC .............. B60R 9/00; B60R 9/06; B60R 9/08; B60R 9/10; B60R 9/048; B60R 9/058
USPC .......... 224/401, 319, 558, 560, 561, 567, 571
See application file for complete search history.

(56) References Cited

U.S. PATENT DOCUMENTS

| | | | |
|---|---|---|---|
| 3,931,919 A * | 1/1976 | Gerber et al. ................. | 224/324 |
| 4,247,030 A | 1/1981 | Amacker | |
| 4,538,752 A * | 9/1985 | Welter .......................... | 224/309 |
| 4,823,673 A * | 4/1989 | Downing ...................... | 89/37.04 |
| 5,791,610 A * | 8/1998 | Sanchez ...................... | 248/176.1 |
| 6,142,349 A * | 11/2000 | Roberson ..................... | 224/401 |
| 6,378,748 B1 | 4/2002 | Cox | |
| 6,474,522 B1 * | 11/2002 | Johnson ........................ | 224/515 |
| 6,502,728 B2 | 1/2003 | Savant | |
| D480,991 S | 10/2003 | Rondeau et al. | |
| 6,659,566 B2 | 12/2003 | Bombardier | |
| 6,843,395 B1 * | 1/2005 | Martin et al. ................. | 224/401 |
| 7,559,444 B1 * | 7/2009 | Church ......................... | 224/401 |
| 8,430,286 B1 * | 4/2013 | Patrick ......................... | 224/401 |
| 2011/0133438 A1 | 6/2011 | Haines et al. | |

* cited by examiner

*Primary Examiner* — J. Gregory Pickett
*Assistant Examiner* — Corey Skurdal
(74) *Attorney, Agent, or Firm* — Daniel Boudwin; Global Intellectual Propperty Agency LLC

(57) ABSTRACT

The present device describes an elevated, accessory attachment assembly for a UTV (utility terrain vehicle) that attaches by way of the vehicle roll cage. The assembly comprises an elongated bar having a pair of clamps that match the roll cage, wherein the bar includes a plurality of retention slots allowing for the attachment of an elevated shelf that substantially increases cargo capacity of the vehicle without compromising the existing cargo area. The slots of the roll cage attachment bar are permanently fixed onto the upper and lower exterior of the attachment bar or removably attached within a slot insertion channel that permits the retention slots to be placed or slid into desired positions along the roll cage attachment bar.

7 Claims, 5 Drawing Sheets

VEHICLE CARGO ACCESSORY DEVICE

CROSS REFERENCE TO RELATED APPLICATION

This application claims the benefit of U.S. Provisional Application No. 61/730,342 filed on Nov. 27, 2012, entitled "Modular UTV Accessory System." The above identified patent application is herein incorporated by reference in its entirety to provide continuity of disclosure.

BACKGROUND OF THE INVENTION

1. Field of the Invention

The present invention relates to an accessory bar. More specifically the present invention pertains to a utility-terrain vehicle (UTV) accessory bar that is configured for attachment to a UTV roll cage for supporting shelving that expands the cargo capacity of the vehicle.

All-terrain vehicles (ATVs), utility-terrain vehicles (UTVs), recreational-terrain vehicles (RTVs) and recreational off-highway vehicles (ROVs) are a few off-road vehicle types that are collectively referred to hereinafter as UTVs. UTVs are defined by their ability to be driven across various forms of terrain that most other vehicles would have great difficulty traversing.

UTVs are increasingly utilized to transport people and goods from one location to another, typically in undeveloped areas. Generally the rear of the UTV houses a flat rack or bed that is used to transport items across a given terrain. These racks often are not configured to carry a great deal of objects and usually require objects to be tied down to maintain stability during the ride. Depending on the quantity of items required to be transported, there may not be enough storage area available to transport the full amount of goods. This limitation makes it difficult when traveling through rough conditions because it is not desirable, or oftentimes logistically possible, to make multiple trips to the intended location.

There are several roll cage attachment assemblies for UTVs in the prior art that attempt to provide for the transport of additional cargo. The drawback of these systems is typically that they attempt to provide extra storage along the bed of the vehicle by attaching modified shelves onto the vehicle beds. The use of these systems is problematic because there is a limited amount of additional storage area added to the already established cargo area.

A further drawback of the prior art is existing devices fail to provide an attachment device that enables the incorporation and removal of a variety of different storage means. The use of static systems is problematic since different destinations and tasks may require different storage accessory needs. Therefore, a modular rack system or storage system providing a user with flexibility of deployment is desired.

The present invention relates to a new and improved rack assembly for attachment to the roll cage of a UTV. Specifically, a roll cage attachment assembly is provided that comprises an accessory support bar that spans the width of the roll cage frame for the purpose of providing a support location to attach additional storage racks and modular storage means thereto. Depending on storage needs, the accessory bar comprises a plurality of retention slots that allow for the attachment of a variety of storage means thereto, including different shelves, baskets, additional rack space, and enclosed containers. The bar is secured at an elevated position on the roll bar to enable the attachment of a storage means in order to provide for more efficient transportation of goods and people. The elevated accessory attachment assembly may additionally be used for the transportation of tools, tires and, smaller racks with the use of locking pins to secure the equipment in place.

2. Description of the Prior Art

Devices have been disclosed in the prior art that relate to UTV accessory attachment systems. These include devices that have been patented and published in patent application publications. These devices generally relate to systems that attach to the bed of the utility vehicle that fail to provide a substantial increase in the cargo capacity within the vehicle without compromising its existing cargo area. The following is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 4,247,030 to Amacker discloses a rack for all-terrain vehicles that comprises a seat and sidewalls for the transportation of goods or people. Clips secured to the rear of the ATV provide for the attachment and transportation of elongated devices such as umbrellas and guns. The carrier seat further includes a foot-rest for the use of a person. Although the Amacker seat is similar in nature to the present invention and relevant to the present invention, the present invention differs from the Amacker prior art in that the present invention provides an elevated attachment mechanism from the bed of the vehicle which provides for a substantial increase in transporting area.

U.S. Pat. No. 6,378,748 to Cox describes a carrier and carrier system having a mounting feature that is effective for connecting to various cargo carrying apparatuses on all-terrain, utility, and recreational vehicles. The securing means comprises bolts extending through the frame-like structure and into the accommodating portion of the vehicle. While the prior art of Cox is relevant and similar to the present invention, the present invention differs in that it provides an elevated attachment mechanism that increases the carrying capacity of the vehicle.

U.S. Pat. No. 6,502,728 to Savant teaches an accessory type ATV carrier rack designed for easy attachment to existing tubular carrier racks. The carrier rack is provided in a variety of models to mate with existing carrier racks and may be slotted to fit any protrusions on the existing carrier racks, thus enabling the carrier rack to be adaptable to fit a variety of ATV racks and available for production in large numbers. The prior art of Savant, however, differs from the present invention in that the it fails to address the problem of providing a substantial amount of additional storage space by proving a shelving feature that extends from the roll bar in an elevated position.

U.S. Pat. No. 6,659,566 to Bombardier describes a carrier rack extension adapted for attachment to an existing rack on the rear of an ATV. The rack extensions are adaptable for positioning onto a variety of existing rack sizes, which enables easy adaptation to a wide variety of existing bar racks. However, while the Bombardier rack attachment is similar to the present invention, the present invention includes a rack extension that is elevated from the bed of the utility vehicle which provides for a substantial increase in transporting area.

U.S. Patent Application Publication No. 2011/0133438 to Haines describes a rack for an ATV. The rack is attached to the roll cage as well as the frame of the all-terrain vehicle. The rack provides removable attachments for connection to and from the existing ATV rack, and further comprises connection means to prevent undesired detachment of the rack from the frame. The rack further comprises one or more tie downs attached to the frame and additionally comprises a means for carrying a tire, a fluid container, or a stretcher on the rack. The prior art of Haines differs from the instant invention in that the instant invention provides a rack extension attached to the roll bar creating an elevated shelf above the vehicle bed, substantially increasing the transport area of the vehicle.

Finally U.S. Pat. No. D480,991 to Rondeau describes a design for an all-terrain vehicle body. The ornamental design provides perspective illustrations of an ATV with an attached rear cargo box. The design further shows the rear attached cargo box as being reclined for aid of inserting or removing items from the box. While the Rondeau design is similar in nature and relevant to the present invention in that it provides a rack for attachment to an all-terrain vehicle, the present invention provides an elevated attachment bar to allow for the incorporation of a shelf allowing for a substantial increase in cargo capacity.

The present invention relates to a UTV elevated, accessory attachment assembly. Specifically, the device comprises a shelf support assembly that provides for the attachment of an elevated shelf spanning the width between the sides of the vehicle roll cage. The attachment bar comprises a plurality of receiving slots that allow for the insertion and removal of shelves, tools, tires, racks, and other devices. Attachment of the accessory bar along an elevated portion of the roll bar frame allows for a substantial increase in storage without compromising the existing capacity of the cargo bed of the utility terrain vehicle.

In view of the aforementioned drawbacks of the prior art, it is shown that the present invention is substantially divergent in design elements from the prior art and it is clear that there is a need for an improvement to the existing storage capacity of utility terrain vehicles. In this regard the instant invention substantially fulfills these needs.

SUMMARY OF THE INVENTION

In view of the foregoing disadvantages inherent in the prior art of utility vehicle attachments, the present invention provides an elevated accessory attachment assembly that enables extra storage capacity above a UTV cargo bed.

The utility vehicle attachment of the present invention is designed for those who desire to have extra capacity to transport items without requiring a user to sacrifice visibility or to modify the bed of their vehicle. An accessory attachment bar uses the existing frame of the vehicle to provide an area for the attachment of additional shelving or for the securement of accessories that are unable to be transported on the bed of the vehicle.

It is therefore an object of the present invention to provide a new and improved elevated accessory attachment assembly that has all of the advantages of the prior art and none of the disadvantages.

It is another object of the present invention to provide a bar with built-in clamps that are formed at an angle that matches the roll cage.

Another object of the present invention is to provide an accessory attachment bar that spans the width between sides of the utility vehicle roll cage.

Yet another object of the present invention is to provide a plurality of attachment slots along a perimeter of the attachment bar.

Finally, another object of the present invention is to provide an attachment bar that is elevated from the UTV bed that provides an additional storage area.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
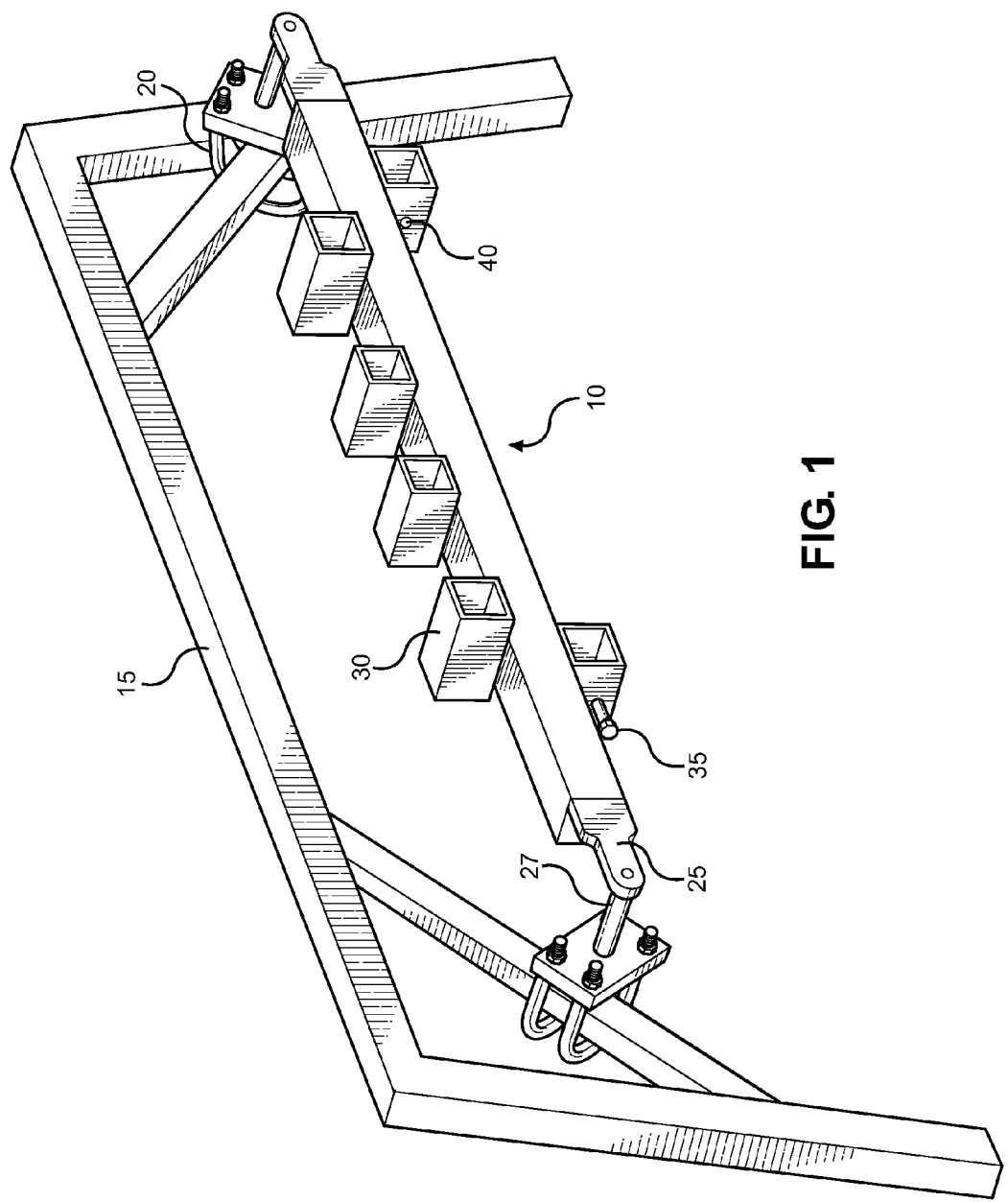
FIG. 1 illustrates a perspective view of the preferred embodiment of the present invention attached to a roll cage of a UTV (utility terrain vehicle).

Reference is made herein to the attached drawings. Like reference numerals are used throughout the drawings to depict like or similar elements of the modular UTV accessory. For the purposes of presenting a brief and clear description of the present invention, the preferred embodiment will be discussed as used for an elevated, accessory attachment assembly that enables a substantial increase in storage capacity above a UTV bed. The figures are intended for representative purposes only and should not be considered to be limiting in any respect.

Referring to FIG. 1, there is shown a perspective view of an accessory attachment bar 10 adapted for use with a roll cage of a UTV. The attachment bar 10 can be slightly modified to fit to any UTV and is adapted for connectivity to an upper portion of a vehicle frame, wherein the frame may comprise the vehicle structure itself or a portion of an overhead roll cage 15 disposed on the vehicle. The accessory bar includes end clamps 25 having a rotatable pin 27 configuration or a static clamp confirmation at the bar ends. The rotatable pin 27 is adapted for rotational reception of U-bolts 25 that secure to the tubular frame 15 at an angle that corresponds to that of the tubular frame 15. Additionally, the accessory bar 10 comprises a plurality retention slots 30 that include apertures 40 and retention pins 35 capable of receiving elements for storage, such as an accessory cage for the transportation of additional cargo in an area separate and above that of the UTV cargo bed.

Figure 2:
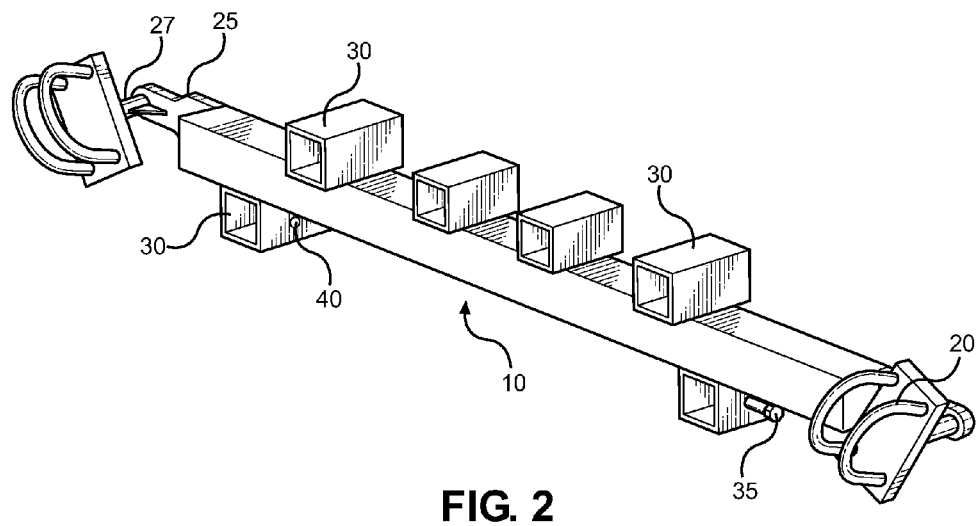
FIG. 2 shows a perspective view of the preferred embodiment of the accessory bar of the present invention.
Figure 3:
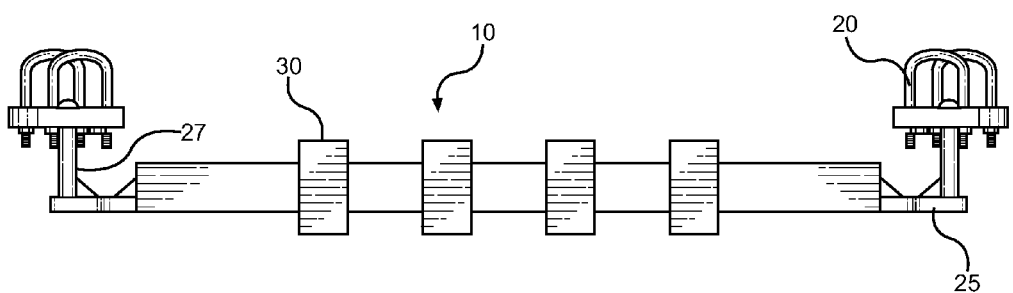
FIG. 3 shows an overhead view of the preferred embodiment of the accessory bar of the present invention.

FIGS. 2 and 3 display perspective views of the preferred embodiment of the accessory attachment bar 10 of the present invention. The accessory bar 10 is preferably constructed of an elongated tubing that comprises end clamps 25 and receiving slots 30 for support of various accessories. The retention slots 30 are located on the upper and lower surfaces of the accessory bar 10. The retention slots 30 are tubular in shape, and have a hollow interior volume. The retention slots 30 preferably comprise a square or rectangular cross section. The retention slots 30 comprise apertures 40 configured for the reception of pins 35 that are adapted to secure the contents inserted within the retention slots 30. The retention slots 30 act as female receivers for the inclusion of the male end of a cargo accessory enabling an increase in the amount of cargo that a vehicle can carry.

The end clamps 25 extend from the ends of the accessory bar 10 and are either statically supported at a given angle or comprise pins that enable the U-bolts 20 to be rotated to an angle that corresponds with that of a tubular frame 15 of a UTV. The U-bolts 20 wrap around the tubular frame 15 of the UTV roll cage and ensure that the items associated with the bar 10 are at a proper and stable angle with respect to the UTV. The pin 27 of the accessory bar clamps 25 project from the clamp 25 and connect the accessory bar 10 to the tubular frame by a plurality of U-bolts 20. The U-bolts 20 connect around the tubular frame 15 and create an indefinite connection thereto.

Figure 4:
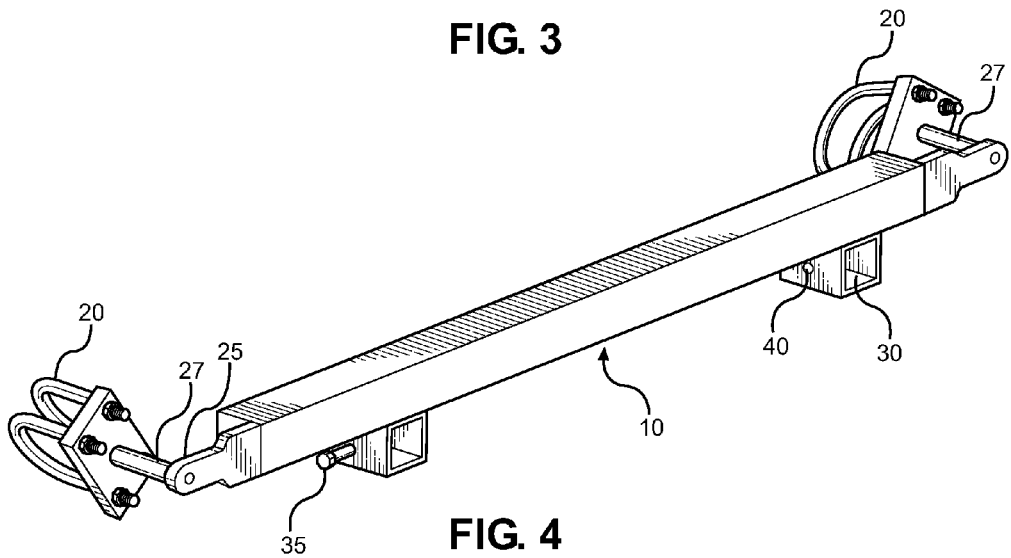
FIG. 4 shows a perspective view of an alternative embodiment of the accessory bar of the present invention.

FIG. 4 displays an alternative embodiment of the accessory bar 10 of the present invention. Similar to that of FIGS. 1-3, the accessory bar 10 of the alternative embodiment comprises clamps 25, pins 27, U-bolts 20, and retention slots 30 having pins 35 and apertures 40; however, the retention slots 30 are only situated on the lower half of the accessory bar 10. It is, however, within the scope of the present invention to have any number of retention slots 30 located on the upper and/or lower halves along differing locations of the accessory bar 10.

The retention slots 30 of the accessory attachment bar 10 are configured to receive the male end of a variety of attachment apparatuses. These attachments can include a full-size rack, smaller rack, gas can holder, shovel and yard tool holder, spare tire mount, cooler basket, and many other supportive attachments.

Figure 5:
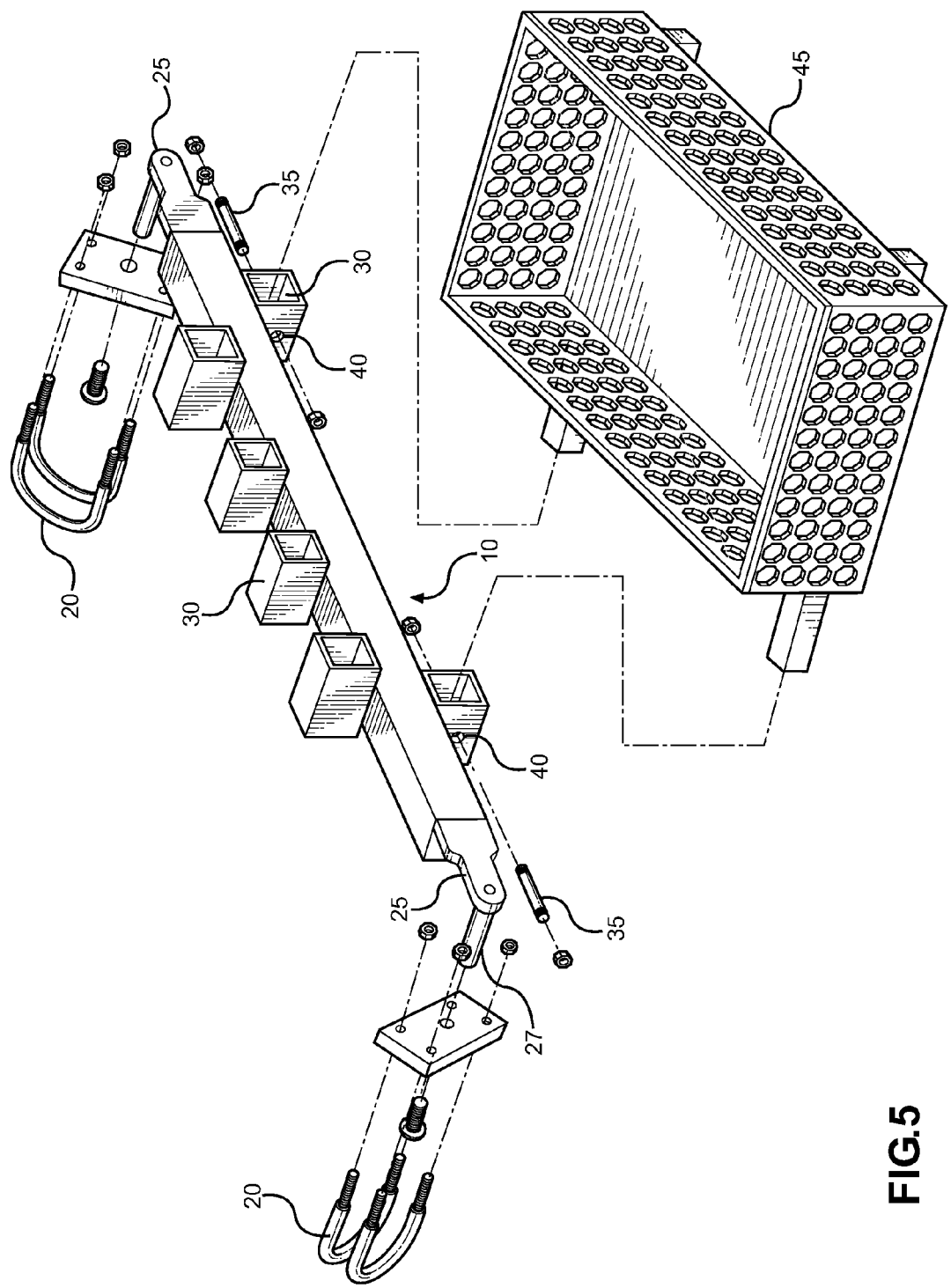
FIG. 5 illustrates an exploded view of the preferred embodiment of the accessory bar of the present invention adapted for connection to a carrying cage.

As displayed in FIG. 5, the retention slots 30 are configured to receive a carrying cage 45. Once the desired attachment device is installed, a locking pin 35 is inserted through an aperture 40 of the retention slot 30 to provide a more secure fitting and to enable efficient changing between accessories. The locking pin 35 may be inserted through apertures of the retention slot 30 and the attached accessory 45, or alternatively the locking pin 35 may provide a tightened fitting against the attached accessory 45 to hold it in place within the accessory bar 10. The locking pin 35 further enables non-weight bearing items, as well as those of a variety of diameters, to be inserted and secured within the retention slots. Examples of such items suitable for insertion and retainment inside the retention slots include those of umbrellas, firearms, rakes, shovels, baseball bats, and fishing rods.

FIG. 5, further illustrates the connection of the U-bolts 20 onto the clamp 25. The clamp 25 has a pin 27 that projects away from the clamp 25 and is configured to receive the U-bolt 20. The U-Bolt comprises an aperture that receives the pin 27 of the clamp 25. The pin 27 comprises a smooth exterior onto which the U-bolt 20 may be secured, while enabling the U-bolt 20 to rotate about the pin 27. Rotation of the U-bolt about the pin 27 of the clamp 25 enables the bar 10 of the present invention to be connected to tubular frames 15 of a variety of angles.

Figure 6A:
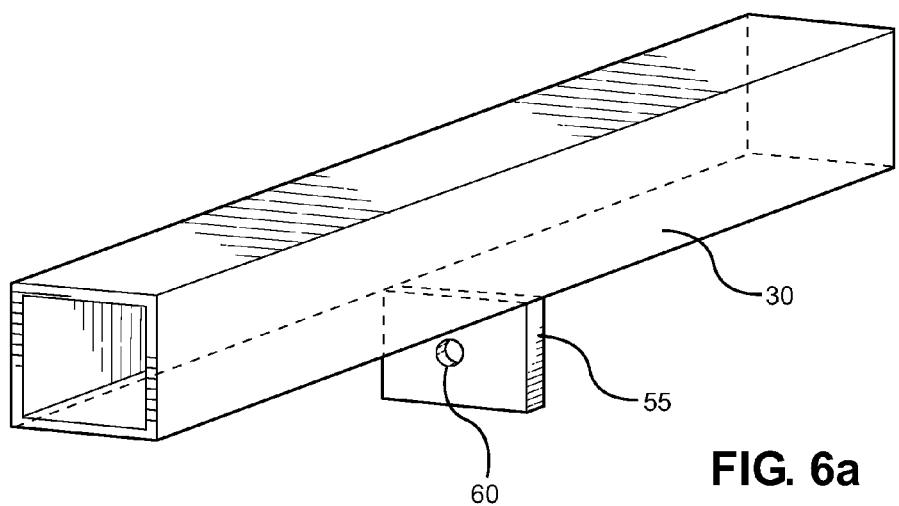
FIG. 6A illustrates a perspective view of an alternative embodiment of an insertable retention slot of the present invention.
Figure 6B:
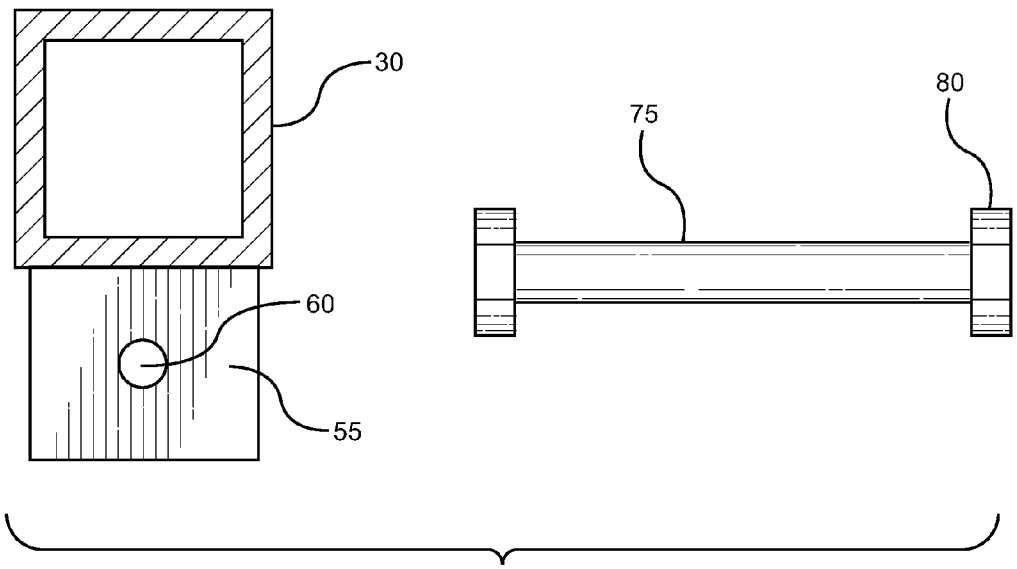
FIG. 6B illustrates an alternative embodiment of the retention slot and locking pin.
Figure 7A:
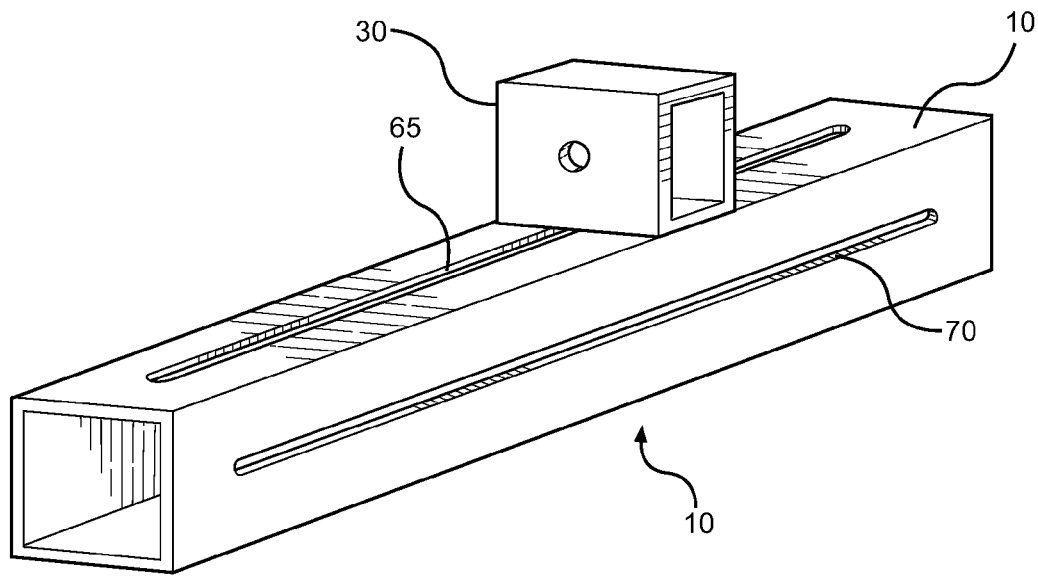
FIG. 7A shows an alternative embodiment of the accessory attachment bar comprising a retention slot insertion channel and a retention slot.

FIGS. 6 and 7 display alternative embodiments of the present invention wherein the accessory attachment bar 10 comprises removable retention slots 30. The removable retention slots 30 of FIG. 6A each comprise a flange 55 extending from the underside of the slot 30 and further include apertures 60 through the flanges 55 for insertion into the accessory attachment bar 10 of FIG. 7A. The accessory attachment bar 10 of the alternative embodiment comprises a channel 65 that spans the length of the bar 10. The channel 65 is configured to receive the flange 55 of the retention slot 30 and permits the slot to be positioned by sliding along the length of the channel 65.

Figure 7B:
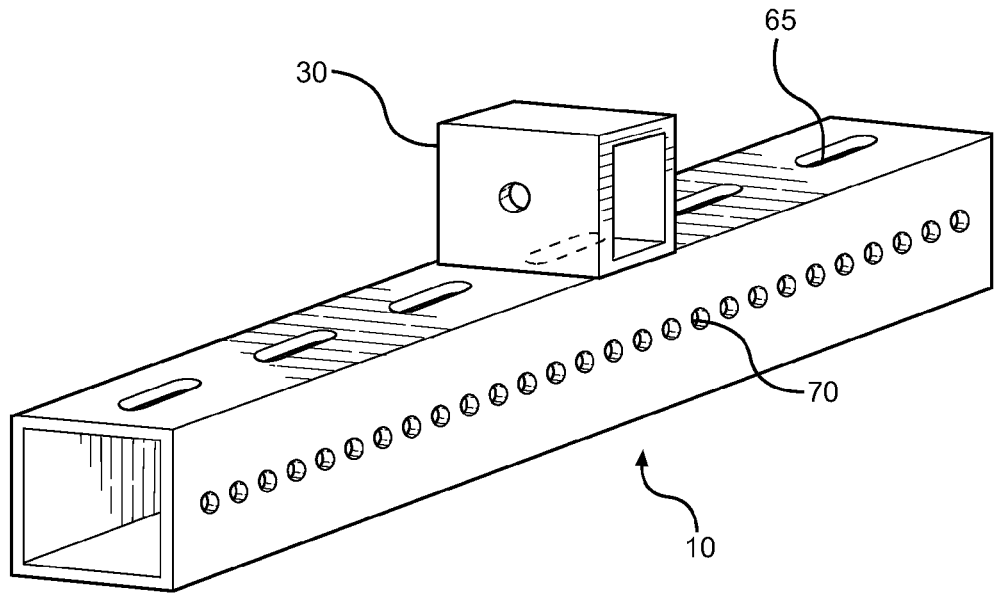
FIG. 7B shows an alternative embodiment of an accessory attachment bar comprising a series of retention slot insertion channels and a retention slot.

In a another embodiment of FIG. 7B, the accessory attachment bar 10 comprises a series of channel cut-outs 65 sized configured to receive the flange 55 of a retention slot 30 and allows for a single retention slot 30 to fit within each channel cut-out 65.

The accessory attachment bars 10 of FIGS. 7A and 7B further comprise securement features to lock each of the retention slots in place. The sides of the accessory attachment bars 10 comprise a side channel 70 configured to correspond with an aperture 60 that extends through the flange 55 of the retention slot 30.

FIG. 6B displays a locking pin 75 configured to be inserted through one end of the fastener slot 70 of FIG. 7A, through the flange aperture 60, and secured at the opposite end by a fastener 80. FIG. 7B further displays an embodiment wherein the fastener slot comprises a series of fastener apertures 70. In the alternative embodiment the locking pin 75 is inserted through one end of a fastener aperture 70, through the flange aperture 60 of the removable retention slot 30, and fastened at the opposite end by a fastener 80.

The present invention provides an improved assembly for attachment onto the tubular roll cage frame 15 of a UTV that spans the width between the sides of the frame 15 and does not rely on the bed of the UTV for support thereof. Depending on storage needs, the accessory attachment assembly comprises a plurality of permanent or removable retention slots 30 on the attachment bar 10 that allow for the equipment of a variety of attachment pieces. The bar 10 has clamps 25, pins 27, and U-bolts 20 that allow for securement of the bar 10 at an elevated position on the frame 15 to enable the installment of an additional shelf 45 without compromising the cargo capacity of the UTV bed. The U-bolts 20 rotate about the pin 27 and wrap around the tubular frame 15 at an angle that matches that of the tubular frame 15 of the UTV to facilitate provide stability while traveling through uneven terrain. The elevated accessory attachment bar 10 retention slots 30 may additionally be used for the transportation of tools, tires, and smaller racks with the use of locking pins 35 to hold the equipment in place.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle cargo accessory device, comprising:
   an accessory attachment bar comprising a first end and a second end;
   said accessory attachment bar first and second end further comprising clamps affixed thereon and adapted for securement around an exposed vehicle frame;
   at least one tubular retention slot having an interior volume, wherein said at least one tubular retention slot is directly affixed to said accessory attachment bar and is positioned perpendicularly thereon, wherein said at least one tubular retention slot is adapted to receive a male end of a cargo accessory therein;
   the at least one retention slot further comprising a flange that is adapted to be removably inserted into a channel disposed on an upper surface of said accessory attachment bar;
   the accessory attachment bar further comprising a side aperture for the insertion of a locking pin adapted to insert through said retention slot flange for retainment thereof.

2. The device of claim 1, wherein the clamps are statically connected to said accessory attachment bar at a given angle that matches said exposed vehicle frame.

3. The device of claim 1, wherein the clamps comprise removably securable U-bolts.

4. The device of claim 1, wherein the clamps are rotatably connected to said accessory attachment bar and are adapted to rotate with respect to said accessory attachment bar.

5. The device of claim 1, wherein said at least one retention slot is removably attached to said accessory attachment bar.

6. The device of claim 1, wherein said at least one retention slot further comprises said locking pin for securing said male end of said cargo accessory.

7. The device of claim 1, wherein said cargo accessory comprises a carrier cage.

* * * * *